March 18, 1941.　　W. F. BERNSTEIN　　2,235,735
OIL SEAL CONSTRUCTION
Filed Jan. 23, 1939
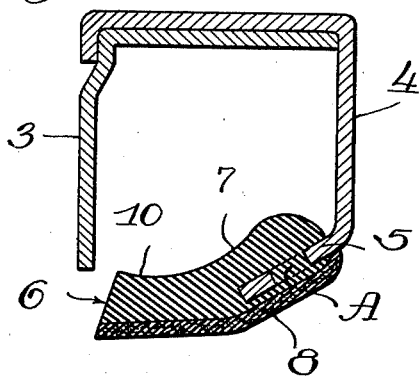
Fig. 1
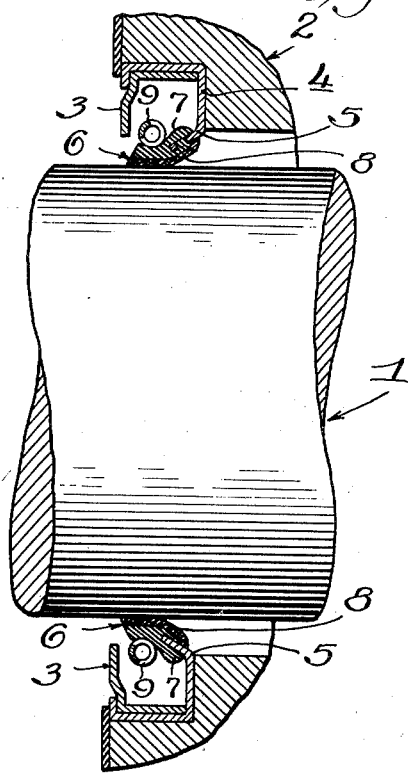
Fig. 2
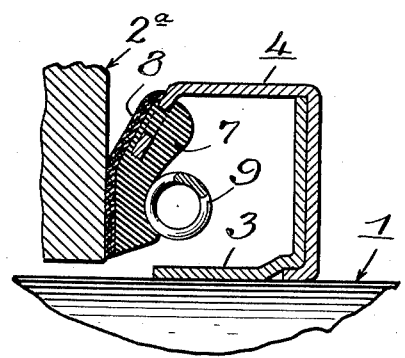
Fig. 3
Fig. 4
INVENTOR.
Wilburn F. Bernstein,
Parkinson & Lane
ATTORNEYS.

Patented Mar. 18, 1941

2,235,735

UNITED STATES PATENT OFFICE 2,235,735

OIL SEAL CONSTRUCTION

Wilburn F. Bernstein, Brookfield, Ill., assignor to Victor Manufacturing & Gasket Company, Chicago, Ill., a corporation of Illinois Application January 23, 1939, Serial No. 252,304

2 Claims. (Cl. 288—3)

The present invention relates to a fluid seal and more particularly to a novel plastic seal adapted to be associated with a rotatable shaft for sealing against the escape or passage of various fluids including oil, grease, water and the cooling liquids employed in internal combustion engines. The novel construction includes a shell adapted to be mounted upon the housing or structure surrounding a rotatable shaft with a novel sealing element in wiping contact and sealing engagement with the shaft, or the shell adapted to be mounted upon the shaft and the sealing element maintained in frictional engagement with the surrounding housing or enclosure.

In a structure of the type disclosed, it is essential that the sealing element be maintained in continuous contact with the surface to be sealed so as to prevent the leakage or escape of oil or grease through the space between the relatively movable machine elements, such as a shaft and its surrounding structure, and to exclude dust and other foreign particles. This object is effectively carried out by the disclosed construction.

Another important object of the present invention is the provision of a fluid or lubricant sealing device with a novel sealing element composed of an inner and outer layer of plastic material molded together and to the binding or supporting shell in such manner as to form an integral unit. The inner or base material is an elastic plastic oil and fluid resistant substance such as one of the so-called synthetic rubbers, and the outer or surface contacting material is formed of a similar plastic substance relatively heavily loaded with graphite and interspersed with a fibrous substance, such as horsehair, for preventing creeping, elongation or distortion of the graphited plastic under operating conditions.

The invention further resides in the combination, construction and arrangements of parts illustrated in the accompanying drawing, and while there is shown therein a preferred embodiment, it is to be understood that the same is susceptible of modification and change and comprehends other details and constructions without departing from the spirit of the invention.

In the drawing:

Figure 1 is a view in vertical cross-section through the novel oil seal.

Figure 2 is a view in vertical cross-section of the complete seal applied to a rotatable shaft, the shaft and surrounding housing or structure being broken away.

Figure 3 is a view similar to Figure 2 but disclosing an exterior oil seal constructed in accordance with the novel invention.

Figure 4 is a fragmentary enlarged view in vertical cross-section of a thrust type seal.

Referring more particularly to the disclosure in the drawing, the novel invention is shown in the form of an internal, external and thrust type seal adapted to seal and prevent the escape of lubricants or other fluids, as well as to exclude dust or other foreign particles from passage into the annular space provided between a pair of relatively movable parts, such as a rotatable shaft 1 and its surrounding housing or machine element 2 or 2ª (Fig. 4). As the construction of the internal, external and thrust type seal is identical except for reversal of parts, the same reference characters have been applied.

The novel seal comprises a sectional retaining shell consisting of an inner member 3 and an outer member 4 adapted to overlap the inner member and be suitably secured thereto, the shell being of such size or diameter as to be securely mounted by a pressed fit or drive into the surrounding housing 2 as shown in Fig. 2, or onto the rotatable shaft 1 as shown in Figs. 3 and 4. Upon a flange 5 of the retaining shell is secured the sealing element 6 comprising a ring or annular layer 7 composed of an elastic and lubricant resistant plastic material and an annular layer of a similar plastic material 8 molded together and molded or secured to the flange 5. In order to insure retention of the sealing element, the flange 5 is provided with openings A in which the plastic material of the element is anchored. The plastic layer 8 provides the surface contacting portion of the seal and is relatively heavily loaded with graphite and interspersed with fibres such as hair. Due to such loading, the abrasive resistance and frictional resisting properties of the layer 8 are greatly enhanced, while the interspersed fibres or hair prevent creeping or distortion of the material 8 under operating conditions.

In order to maintain the sealing element in wiping contact and thereby seal the annular space provided between the relatively movable elements, such as the shaft and surrounding housing, there is provided a contractile or garter spring 9 adapted to be received in a depression 10 formed in the layer of plastic material 7. In Fig. 3 the spring 9ª is shown as expansible.

The plastic material employed has the property of being resistant to attack by oil, grease, water, oxygen and other fluids and for this purpose I preferably employ one of the so-called synthetic rubbers such as polymerized butadiene, polymerized chloroprene, rubber hydrochloride or polyethyline sulfide. Excellent results have been secured by employing polymerized butadiene as the plastic material.

From the above description and the disclosure in the drawing, it will be readily apparent that the invention comprehends a novel oil or lubricant seal incorporating a novel sealing element for effectively and continuously sealing the annular space between relatively rotatable elements against the escape of fluids such as lubricants, water and cooling liquids where the seal is employed on an internal combustion engine, as well as effectively excluding dust and other foreign particles. Due to the construction of the seal, it has universal application and is equally effective whether applied from one direction or the other as required in installation.

Having thus disclosed the invention, I claim:

1. An oil seal construction adapted to be mounted upon or associated with a rotatable shaft for sealing the opening between the shaft and a surrounding housing, comprising a supporting retainer and a unitary sealing element supported by the retainer, said sealing element consisting of an inner and an outer layer, one of the layers being of elastic material and the other of less elasticity and providing a sealing contact with the surface to be sealed, said last mentioned layer being relatively heavily loaded with graphite and interspersed with hair for preventing creeping and distortion and improving its sealing characteristics under varying conditions of operation.

2. In an oil seal, a sealing element composed of separate layers of material molded to form an integral unit, one of said layers being elastic and the other of less elasticity, the latter providing the sealing surface and being loaded with graphite for enhancing the frictional characteristics of said layer, and hair dispersed in said last mentioned layer for preventing creeping.

WILBURN F. BERNSTEIN.